US009395563B2

(12) United States Patent
Nejadmalayeri

(10) Patent No.: US 9,395,563 B2
(45) Date of Patent: Jul. 19, 2016

(54) ELECTRO-OPTIC MODULATOR AND OPTIC TRANSMISSION MODULATOR INCLUDING THE SAME

(71) Applicant: Samsung Electronics Co., Ltd., Suwon-Si, Gyeonggi-Do (KR)

(72) Inventor: Amir Hossein Nejadmalayeri, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/445,647

(22) Filed: Jul. 29, 2014

(65) Prior Publication Data

US 2015/0036963 A1 Feb. 5, 2015

Related U.S. Application Data

(60) Provisional application No. 61/860,970, filed on Aug. 1, 2013.

(30) Foreign Application Priority Data

Feb. 21, 2014 (KR) .................. 10-2014-0020675

(51) Int. Cl.
*G02F 1/035* (2006.01)
*G02F 1/295* (2006.01)
(Continued)

(52) U.S. Cl.
CPC .............. *G02F 1/025* (2013.01); *G02F 1/0353* (2013.01); *G02F 1/03* (2013.01); *G02F 1/0305* (2013.01)

(58) Field of Classification Search
CPC ......... G02F 1/025; G02F 1/0353; G02F 1/03; G02F 1/0305

USPC ...................... 385/1–4, 8, 9, 14, 40, 129–132
See application file for complete search history.

(56) References Cited

U.S. PATENT DOCUMENTS 4,997,246 A 3/1991 May et al.
6,298,177 B1 * 10/2001 House .................... G02F 1/025
385/3

(Continued)

FOREIGN PATENT DOCUMENTS

JP 2011242487 A 12/2011
JP 4920506 B2 4/2012
KR 100249812 B1 3/2000

*Primary Examiner* — Kaveh C Kianni
*Assistant Examiner* — Hung Law
(74) *Attorney, Agent, or Firm* — Harness, Dickey & Pierce, P.L.C.

(57) ABSTRACT

An electro-optic modulator includes a semiconductor substrate, a core region and slab regions. The core region is formed on the semiconductor substrate and includes a first low concentration doping region, a second low concentration doping region and a high concentration doping region formed between the first low concentration doping region and the second low concentration doping region. Slab regions are formed on the semiconductor substrate. The slab regions are in contact with the core region. A width of a depletion region included in the core region may be controlled based on a reverse bias voltage applied between the first low concentration doping region and the second low concentration doping region. If the width of a depletion region is controlled, an optical signal transmitted through the depletion region may be controlled. The electro-optic modulator according to example embodiments may increase an operation speed and decrease a power consumption of a system.

16 Claims, 13 Drawing Sheets

300a

| LOW CONCENTRATION P-DOPING REGION(310) |
|---|
| HIGH CONCENTRATION P-DOPING REGION(351) |
| HIGH CONCENTRATION N-DOPING REGION(353) |
| LOW CONCENTRATION N-DOPING REGION(330) |

D1
D2

(51) Int. Cl.
  *G02F 1/025* (2006.01)
  *G02F 1/03* (2006.01)

(56) References Cited

U.S. PATENT DOCUMENTS

| | | | |
|---|---|---|---|
| 6,956,652 B2 * | 10/2005 | Whitbread | G06E 3/003 356/450 |
| 7,075,119 B2 | 7/2006 | Hanamaki | |
| 7,142,342 B2 | 11/2006 | Bour et al. | |
| 7,180,648 B2 | 2/2007 | Dohrman et al. | |
| 7,359,588 B2 | 4/2008 | Kang et al. | |
| 7,447,395 B2 * | 11/2008 | Montgomery | G02F 1/225 385/14 |
| 7,577,319 B2 | 8/2009 | Makino et al. | |
| 7,711,212 B2 * | 5/2010 | Green | G02F 1/025 257/256 |
| 8,346,028 B2 | 1/2013 | Feng et al. | |
| 8,488,917 B2 | 7/2013 | Manipatruni et al. | |
| 2010/0215308 A1 | 8/2010 | Moodie | |
| 2011/0211786 A1 | 9/2011 | Ushida et al. | |
| 2012/0134383 A1 | 5/2012 | Yamatoya | |
| 2014/0248019 A1 * | 9/2014 | Witzens | G02F 1/021 385/2 |

* cited by examiner

FIG. 6
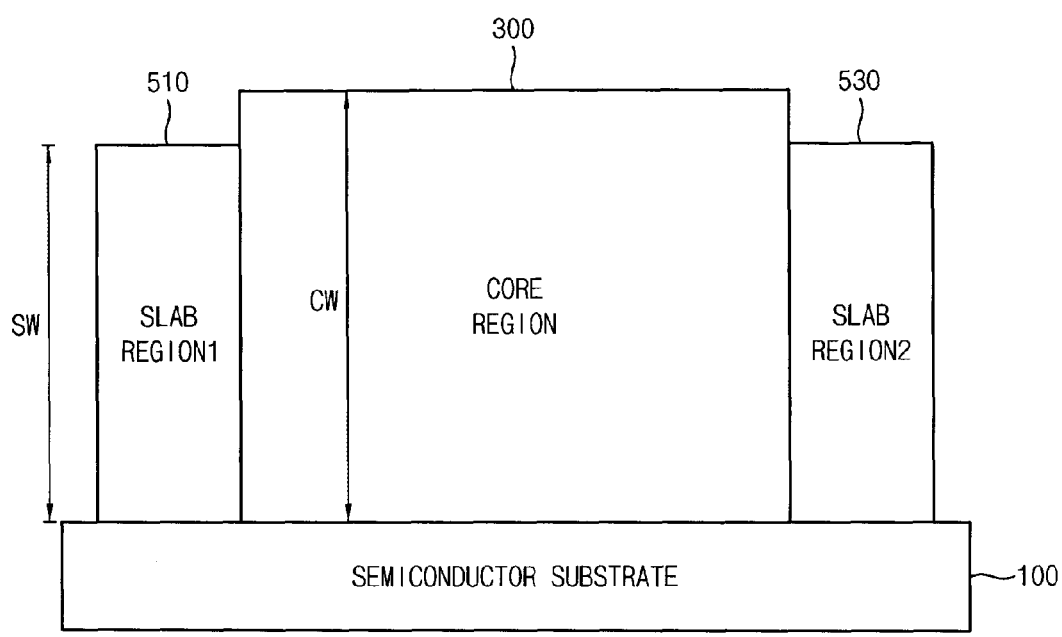

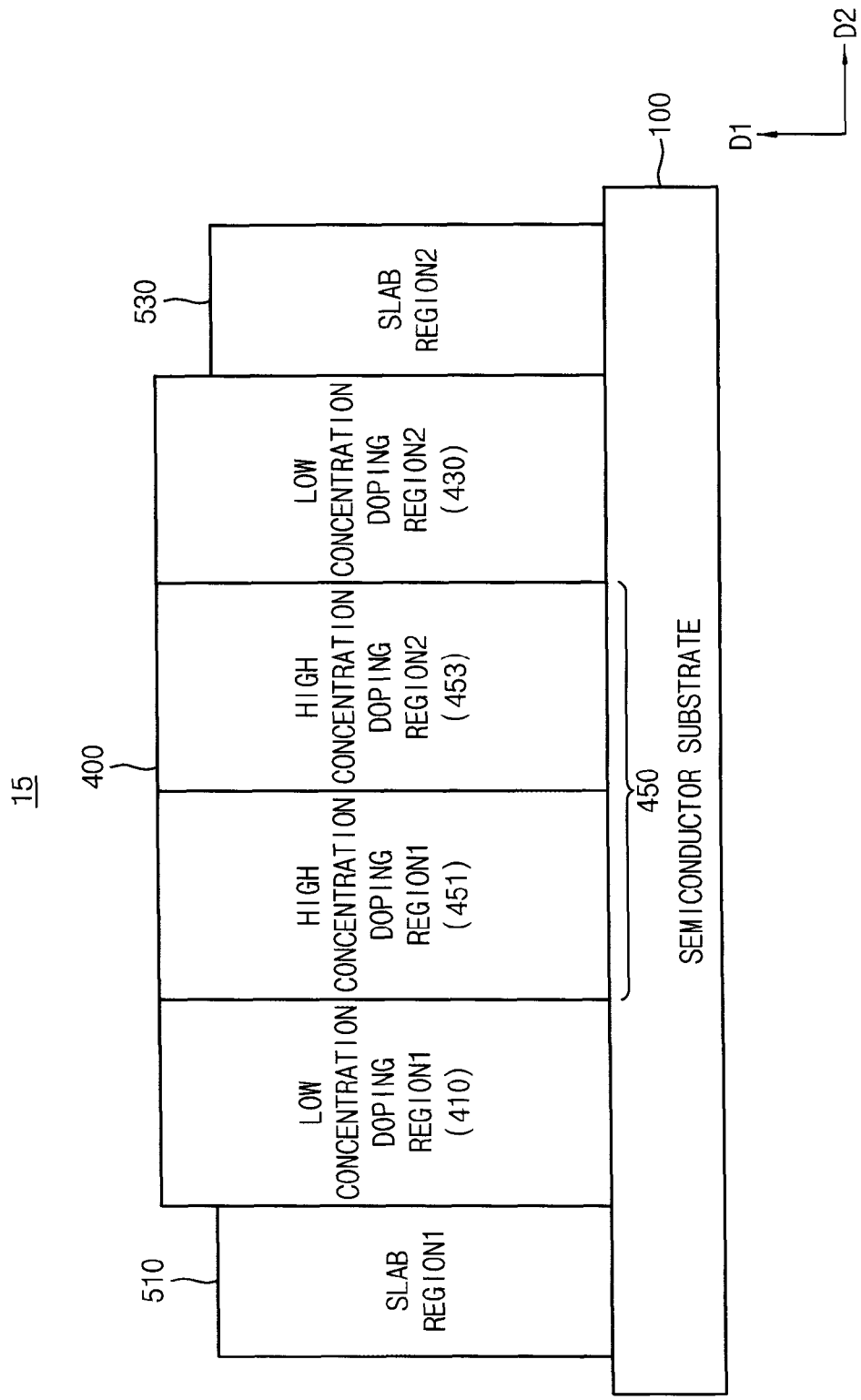

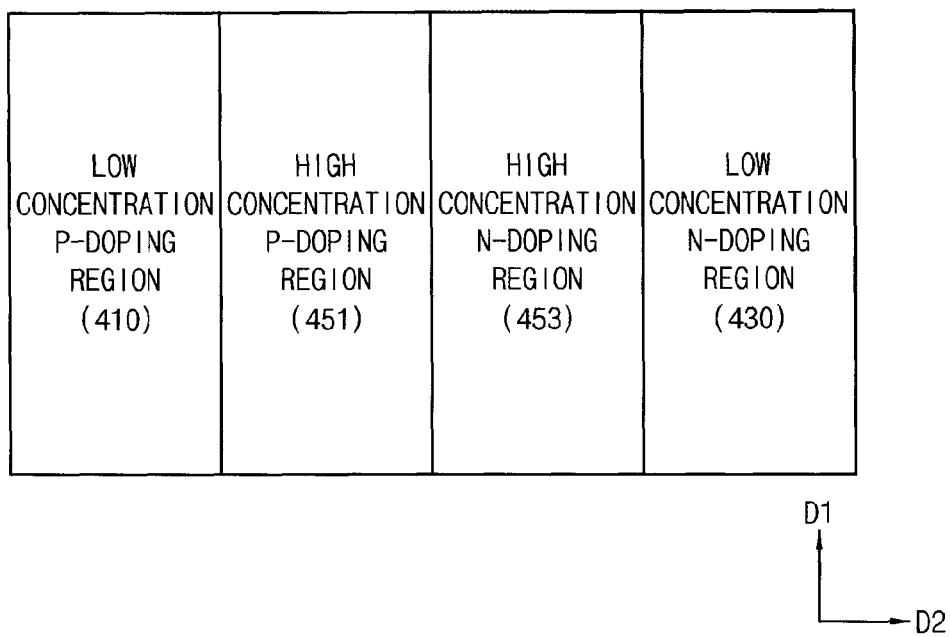
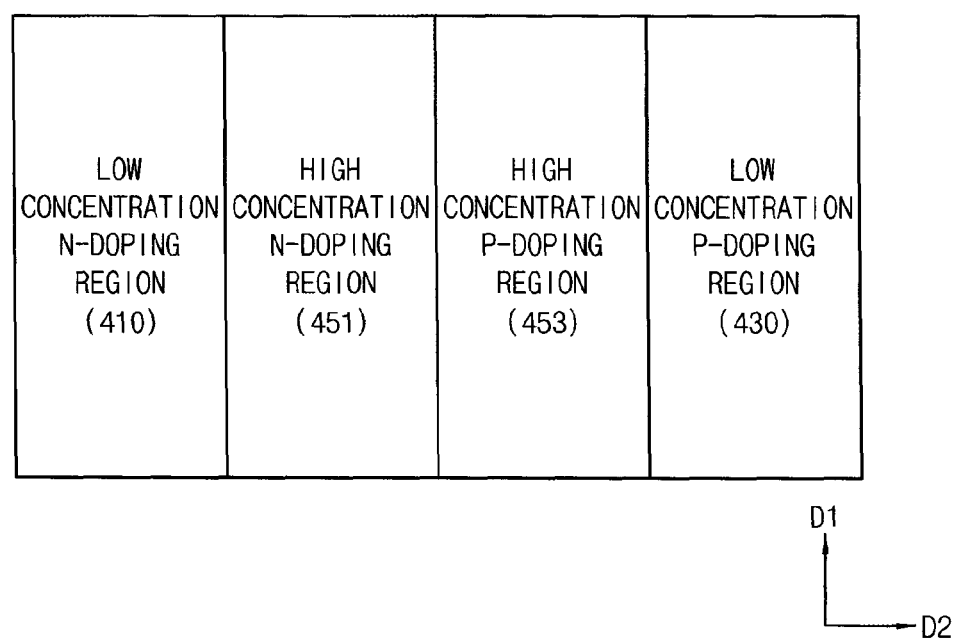

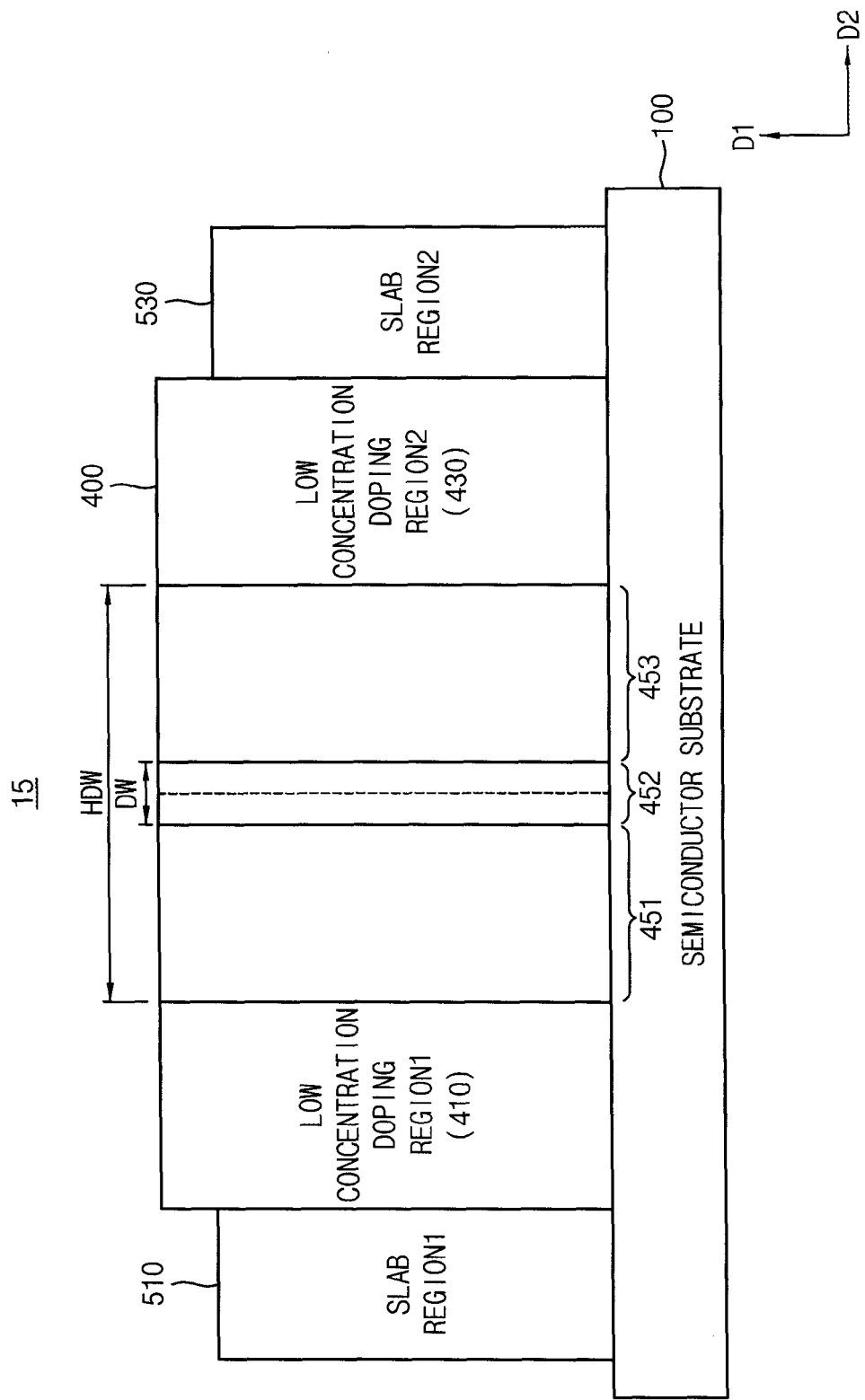

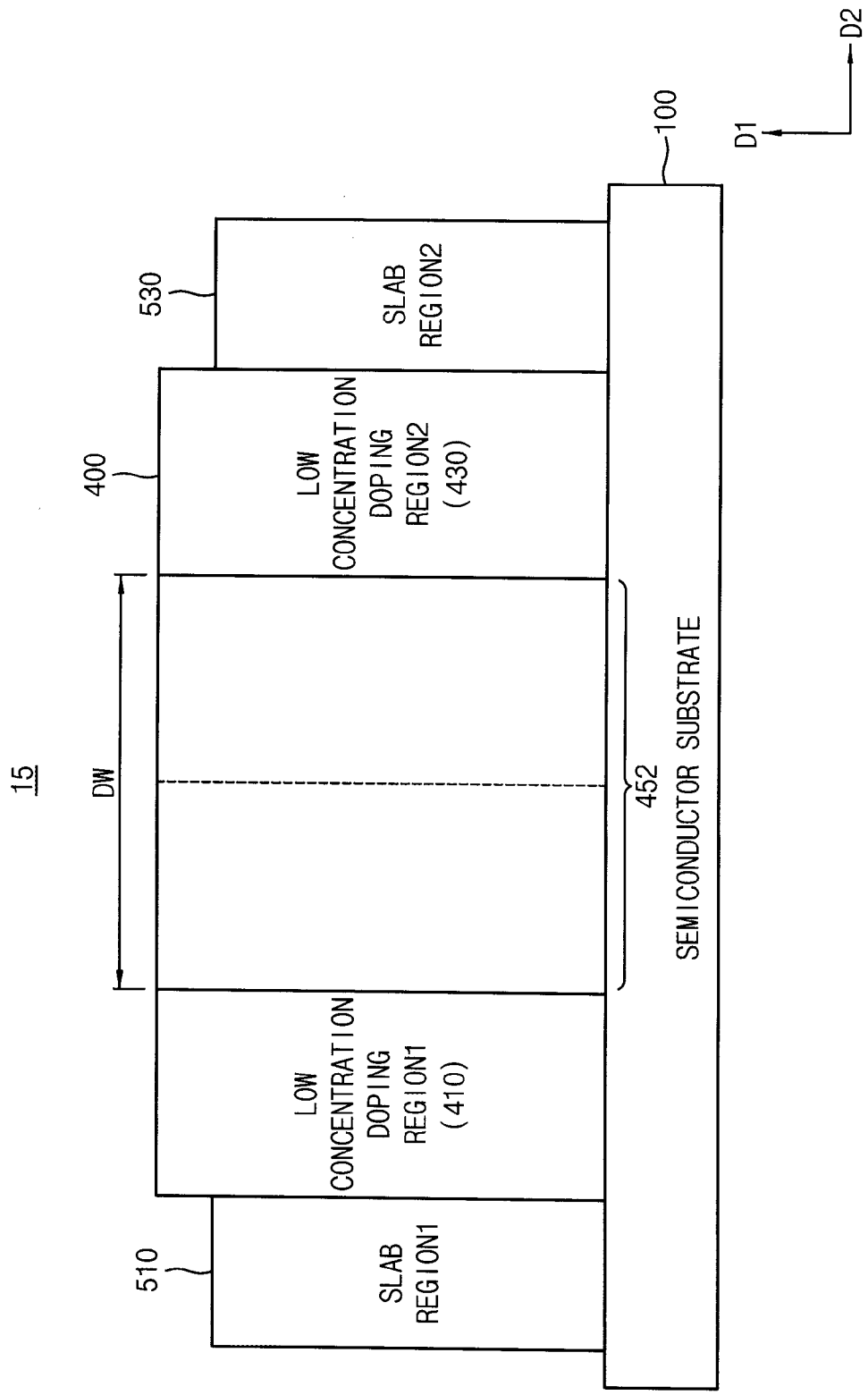

ELECTRO-OPTIC MODULATOR AND OPTIC TRANSMISSION MODULATOR INCLUDING THE SAME

CROSS-REFERENCE TO RELATED APPLICATION

This application claims priority under 35 USC §119 to U.S. Provisional Application No. 61/860,970 filed on Aug. 1, 2013 in the USPTO, and Korean Patent Applications No. 10-2014-0020675, filed on Feb. 21, 2014 in the Korean Intellectual Property Office (KIPO), the contents of which are herein incorporated by reference in their entirety.

BACKGROUND

1. Technical Field

Example embodiments relate generally to a memory device, an electro-optic modulator and/or an optic transmission modulator including the electro-optic modulator.

2. Description of the Related Art

According to the development of semiconductor technology, various electronic devices, such as an application processor device, a memory device, a display device, etc., are being developed to have higher performance and higher speed. However, electrical transmission lines used with high performance electronic devices may be a factor limiting the transmission speed. Therefore optical transmission may be used to increase the transmission speed.

SUMMARY

Some example embodiments provide an electro-optic modulator capable of increasing an operation speed and decreasing a power consumption of a system.

Some example embodiments provide an optic transmission modulator capable of increasing the operation speed and decreasing the power consumption of the system.

According to example embodiments, an electro-optic modulator includes a semiconductor substrate, a core region and slab regions. The core region is formed on the semiconductor substrate and includes a first low concentration doping region, a second low concentration doping region and a high concentration doping region formed between the first low concentration doping region and the second low concentration doping region. The slab regions are formed on the semiconductor substrate. The slab regions are in contact with the core region.

The core region may act as a waveguide for optical signals.

The high concentration doping region may include a first high concentration doping region and a second high concentration doping region. The first high concentration doping region may be formed between the first low concentration doping region and the second low concentration doping region and the first high concentration doping region may be in contact with the first low concentration doping region. The second high concentration doping region may be formed between the first high concentration doping region and the second low concentration doping region and The second high concentration doping region may be in contact with the second low concentration doping region. The first high concentration doping region and the second high concentration doping region may be in contact with each other.

The first low concentration doping region, the first high concentration doping region, the second high concentration doping region and the second low concentration doping region included in the core region may be placed along a first direction and the second low concentration doping region may be in contact with the semiconductor substrate. The first direction may be perpendicular to a surface of the semiconductor substrate.

A dopant concentration of the first low concentration doping region and a dopant concentration of the second low concentration doping region may be lower than a dopant concentration of the high concentration doping region. The first low concentration doping region may be a p-type dopant doping region. The second low concentration doping region may be an n-type dopant doping region.

The first high concentration doping region may be the p-type dopant doping region in case the first low concentration doping region is the p-type dopant doping region. The second high concentration doping region may be the n-type dopant doping region in case the second low concentration doping region is the n-type dopant doping region.

A dopant concentration of the first low concentration doping region may be lower than a dopant concentration of the first high doping concentration region. A dopant concentration of the second low concentration doping region may be lower than a dopant concentration of the second high concentration doping region.

The first high concentration doping region may be n-type dopant doping region in case the first low concentration doping region is the n-type dopant doping region. The second high concentration doping region may be p-type dopant doping region in case the second low concentration doping region is the p-type dopant doping region.

An operating voltage may be applied between the first low concentration doping region and the second low concentration doping region.

A width of a depletion region included in the core region may be controlled based on the operating voltage.

In case the operating voltage applied between the first low concentration doping region and the second low concentration doping region is a zero voltage, the width of the depletion region may be narrower than the width of the high concentration doping region.

In case the operating voltage is a reverse bias voltage, the width of the depletion region may be increased as the reverse bias voltage is increased.

An optical loss of the core region may change as the width of the depletion region is changed.

The intensity of a transmitted optical signal may be modified as the loss of the core region is changed.

A width of the core region may be greater than the width of the slab region. The electro-optic modulator may be implemented using at least one selected from a group consisting of Si, Ge, GaAs and a combination thereof.

The first low concentration doping region, the first high concentration doping region, the second high concentration doping region and the second low concentration doping region included in the core region may be placed along a second direction that is perpendicular to a first direction. The second direction may be parallel to a surface of the semiconductor substrate.

A width of a depletion region included in the core region may be controlled based on the operating voltage applied between the first low concentration doping region and the second low concentration doping region. In case the operating voltage is a reverse bias voltage, the width of the depletion region may be increased as the reverse bias voltage is increased.

According to example embodiments, an optic transmission modulator includes an electro-optic modulator. An electro-optic modulator converts a transmission electrical signal to a transmission optical signal transmitted to the memory controller. The electro-optic modulator includes a semiconductor substrate, a core region and slab regions. The core region is formed on the semiconductor substrate and includes a first low concentration doping region, a second low concentration doping region and a high concentration doping region formed between the first low concentration doping region and the second low concentration doping region. The slab regions are formed on the semiconductor substrate. The slab regions are in contact with the core region.

At least one example embodiment relates to a memory module.

In at least one example embodiment, the memory module include a modulator configured to optically connect the memory module to a memory controller and exchange signals therebetween, the modulator including an optical waveguide, the optical waveguide being a doped semiconductor having a depletion region therein, the modulator configured to control a width of the depletion region based on an externally applied reverse bias voltage.

In at least one example embodiment, the modulator includes a core region on a semiconductor substrate between slab regions, the core region and the slab regions configured as the optical waveguide, the core region including at least two low concentration regions and at least two high concentration regions between the low concentration regions, the modulator configured to supply the reverse bias voltage between the low concentration regions such that the depletion region is formed therebetween.

BRIEF DESCRIPTION OF THE DRAWINGS

Illustrative, non-limiting example embodiments will be more clearly understood from the following detailed description taken in conjunction with the accompanying drawings.

FIG. 6 is a diagram illustrating a width of the core region and a slab region included in the electro-optic modulator of FIG. 1.

FIG. 7 is a cross-sectional diagram illustrating a perpendicular structure of the electro-optic modulator according to an example embodiment.

FIG. 8 is a cross-sectional diagram illustrating an example of a core region included in the electro-optic modulator of FIG. 7.

FIG. 9 is a cross-sectional diagram illustrating another example of the core region included in the electro-optic modulator of FIG. 7.

FIG. 10 is a diagram for describing a case of applying a zero voltage to the electro-optic modulator of FIG. 7.

FIG. 11 is a diagram for describing a case of applying a reverse bias voltage to the electro-optic modulator of FIG. 7.

DETAILED DESCRIPTION OF THE EMBODIMENTS

Figure 1:
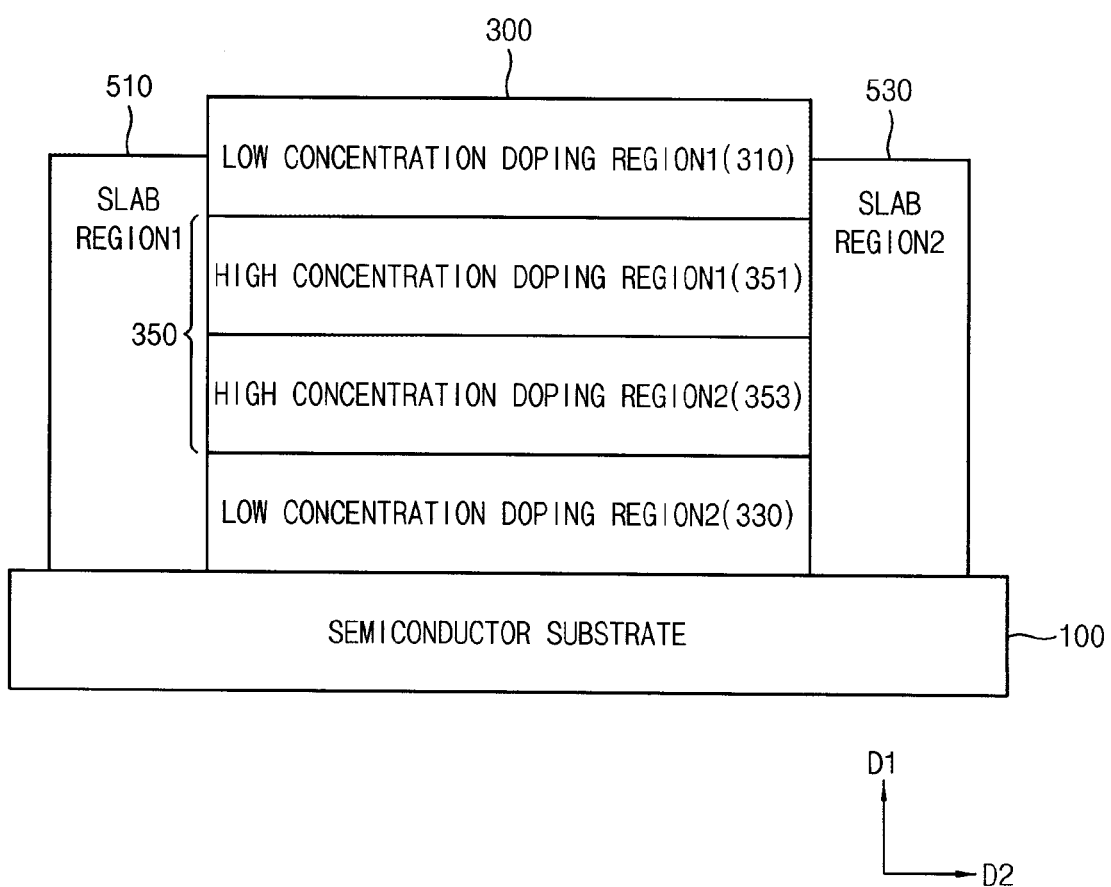
FIG. 1 is a cross-sectional diagram illustrating a perpendicular structure of an electro-optic modulator according to example embodiments.

Various example embodiments will be described more fully hereinafter with reference to the accompanying drawings, in which some example embodiments are shown. Example embodiments of the inventive concepts may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of example embodiments of the inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which these example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional diagram illustrating a perpendicular structure of an electro-optic modulator according to example embodiments.

Referring to FIG. 1, an electro-optic modulator 10 includes a semiconductor substrate 100, a core region 300 and slab regions 510 and 530. The core region 300 is formed on the semiconductor substrate 100 and includes a first low concentration doping region 310, a second low concentration doping region 330 and a high concentration doping region 350. The high concentration doping region 350 is formed between the first low concentration doping region 310 and the second low concentration doping region 330. The high concentration doping region 350 includes a first high concentration doping region 351 and a second high concentration doping region 353.

The first low concentration doping region 310 and the second low concentration doping region 330 may be doped with different types of dopant. For example, the first low concentration doping region 310 may be doped with a P-type dopant. If the first low concentration doping region 310 is doped with a P-type dopant, the second low concentration doping region 330 may be doped with a N-type dopant. For example, the first low concentration doping region 310 may be doped with the N-type dopant. If the first low concentration doping region 310 is doped with the N-type dopant, the second low concentration doping region 330 may be doped with the P-type dopant.

In an example embodiment, the high concentration doping region 350 may include the first high concentration doping region 351 and the second high concentration doping region 353. The first high concentration doping region 351 may be formed between the first low concentration doping region 310 and the second low concentration doping region 330 and the first high concentration doping region 351 may be in contact with the first low concentration doping region 310. The second high concentration doping region 353 may be formed between the first high concentration doping region 351 and the second low concentration doping region 330 and the second high concentration doping region 353 may be in contact with the second low concentration doping region 330. The first high concentration doping region 351 and the second high concentration doping region 353 may be in contact with each other.

The first high concentration doping region 351 and the second high concentration doping region 353 may be doped with the different types of dopant. For example, the first high concentration doping region 351 may be doped with a P-type dopant. If the first high concentration doping region 351 is doped with a P-type dopant, the second high concentration doping region 353 may be doped with an N-type dopant. For example, the first high concentration doping region 351 may be doped with the N-type dopant. If the first high concentration doping region 351 is doped with the N-type dopant, the second high concentration doping region 353 may be doped with the P-type dopant.

In an example embodiment, the first low concentration doping region 310, the first high concentration doping region 351, the second high concentration doping region 353 and the second low concentration doping region 330 included in the core region 300 may be placed along a first direction D1 and the second low concentration doping region 330 may be in contact with the semiconductor substrate 100. The first direction D1 may be perpendicular to a surface of the semiconductor substrate 100. The second direction D2 may be parallel to the surface of the semiconductor substrate 100.

A width of a depletion region included in the core region 300 may be controlled based on a reverse bias voltage applied between the first low concentration doping region 310 and the second low concentration doping region 330. For example, if the first low concentration doping region 310 is doped with the P-type dopant and the second low concentration doping region 330 is doped with the N-type dopant, a voltage level applied to the first low concentration doping region 310 is lower than a voltage level applied to the second low concentration doping region 330. Likewise, if the first low concentration doping region 310 is doped with the N-type dopant and the second low concentration doping region 330 is doped with the P-type dopant, the voltage level applied to the first low concentration doping region 310 is higher than the voltage level applied to the second low concentration doping region 330.

The slab regions 510 and 530 are formed on the semiconductor substrate 100. The slab regions 510 and 530 are in contact with the core region 300. The slab regions 510 and 530 may include a first slab region 510 and a second slab region 530. The first slab region 510 and the second slab region 530 may be doped with the different types of the dopant. For example, the first slab region 510 may be doped with the P-type dopant. If the first slab region 510 is doped with the P-type dopant, the second slab region 530 may be doped with the N-type dopant.

In an example embodiment, the core region 300 may act as a waveguide for transferring optical signals.

A width of a depletion region included in the core region 300 may be controlled based on a reverse bias voltage applied between the first low concentration doping region 310 and the second low concentration doping region 330. If the width of a depletion region is controlled, an optical signal transmitted through the depletion region may be controlled. The electro-optic modulator 10 according to example embodiments may increase an operation speed and decrease a power consumption of a system.

Figure 2:
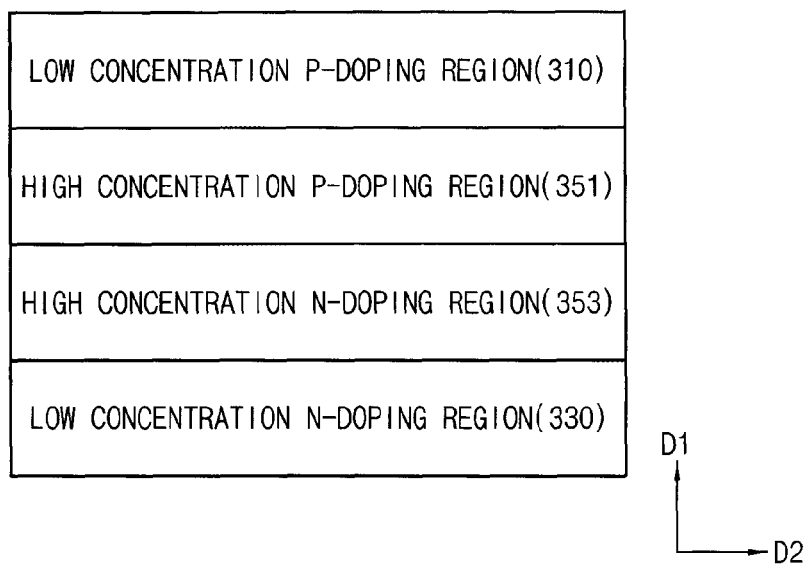
FIG. 2 is a cross-sectional diagram illustrating an example of a core region included in the electro-optic modulator of FIG. 1.

FIG. 2 is a cross-sectional diagram illustrating an example of a core region included in the electro-optic modulator of FIG. 1.

Referring to FIG. 2, a core region 300a is an example of the core region 300 illustrated in FIG. 1, therefore, for the sake of brevity repeated description of the relationship between the regions 310, 330, 351 and 353 will be omitted.

In the core region 300a, the first low concentration doping region 310 and the first high concentration doping region 351 are doped with P-type dopants and the second low concentration doping region 330 and the second high concentration doping region 353 are doped with N-type dopants.

For example, the first low concentration doping region 310 may be a low concentration P-type doping region, the second low concentration doping region 330 may be a low concentration N-type doping region, the first high concentration doping region 351 may be a high concentration P-type doping region and the second high concentration doping region 353 may be a high concentration N-type doping region.

The first high concentration doping region 351 may be formed between the first low concentration doping region 310 and the second low concentration doping region 330 and the first high concentration doping region 351 may be in contact with the first low concentration doping region 310. The second high concentration doping region 353 may be formed between the first high concentration doping region 351 and the second low concentration doping region 330 and the second high concentration doping region 353 may be in contact with the first high concentration doping region 351.

For example, along the first direction D1, a lowest layer of the core region 300a may be the second low concentration doping region 330. The second low concentration doping region 330 may be doped with the N-type dopant. The second high concentration doping region 353 may be formed on the second low concentration doping region 330. The second high concentration doping region 353 may be in contact with the second low concentration doping region 330. The second high concentration doping region 353 may be doped with the N-type dopant. The first high concentration doping region 351 may be formed on the second high concentration doping region 353. The first high concentration doping region 351 may be in contact with the second high concentration doping region 353. The first high concentration doping region 351 may be doped with the P-type dopant. The first low concentration doping region 310 may be formed on the first high concentration doping region 351. The first low concentration doping region 310 may be in contact with the first high concentration doping region 351. The first low concentration doping region 310 may be doped with the P-type dopant.

In an example embodiment, a dopant concentration of the first low concentration doping region 310 may be lower than a dopant concentration of the first high concentration doping region 351. A dopant concentration of the second low concentration doping region 330 may be lower than a dopant concentration of the second high concentration doping region 353.

In an example embodiment, the dopant concentration of the first low concentration doping region 310 may be lower than the dopant concentration of the high concentration doping region 350. If the dopant concentration of the high concentration doping region 350 is high, a carrier density of the high concentration doping region 350 may be high. If the carrier density is high, a transmission of the optical signal may be blocked.

For example, the first low concentration doping region 310 may be doped with the P-type dopant. In this case, the P-type dopant in the first high concentration doping region 351 may be greater than the P-type dopant in the first low concentration doping region 310. If the P-type dopant in the first high concentration doping region 351 is greater than the P-type dopant in the first low concentration doping region 310, the transmission of the optical signal through the first high concentration doping region 351 may be blocked. Likewise, the second low concentration doping region 330 may be doped with the N-type dopant. In this case, the N-type dopant in the second high concentration doping region 353 may be greater than the N-type dopant in the second low concentration doping region 330. If the N-type dopant in the second high concentration doping region 353 is greater than the N-type dopant in the second low concentration doping region 330, the transmission of the optical signal through the second high concentration doping region 353 may be blocked.

The width of a depletion region included in the core region 300a may be controlled based on a reverse bias voltage applied between the first low concentration doping region 310 and the second low concentration doping region 330.

For example, if the first low concentration doping region 310 is doped with the P-type dopant, the second low concentration doping region 330 may be doped with the N-type dopant. The voltage level applied to the first low concentration doping region 310 is lower than the voltage level applied to the second low concentration doping region 330. The depletion region in the high concentration doping region 350 may be formed by the reverse bias voltage applied between the first low concentration doping region 310 and the second low concentration doping region 330. If the reverse bias voltage is applied, the width of the depletion region included in the core region 300a may be controlled. If the width of the depletion region is controlled, the optical signal transferred through the depletion region may be controlled.

The first high concentration doping region 351 may be the p-type dopant doping region in case the first low concentration doping region 310 is the p-type dopant doping region. The second high concentration doping region 353 may be the n-type dopant doping region in case the second low concentration doping region 330 is the n-type dopant doping region.

Figure 3:
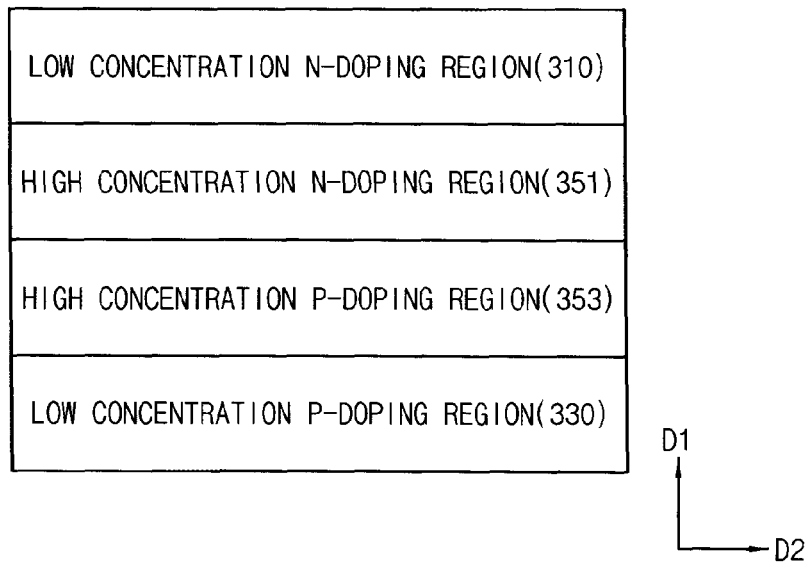
FIG. 3 is a cross-sectional diagram illustrating another example of the core region included in the electro-optic modulator of FIG. 1.

FIG. 3 is a cross-sectional diagram illustrating another example of the core region included in the electro-optic modulator of FIG. 1.

Referring to FIG. 3, a core region 300b is an example of the core region 300 illustrated in FIG. 1, therefore, for the sake of brevity repeated description of the relationship between the regions 310, 3330, 351 and 353 will be omitted.

In the core region 300b, the first low concentration doping region 310 and the first high concentration doping region 351 are doped with N-type dopants and the second low concentration doping region 330 and the second high concentration doping region 353 are doped with P-type dopants.

For example, the first low concentration doping region 310 may be a low concentration N-type doping region, the second low concentration doping region 330 may be a low concentration P-type doping region, the first high concentration doping region 351 may be a high concentration N-type doping region, and the second high concentration doping region 353 may be a high concentration P-type doping region.

For example, along the first direction D1, a lowest layer of the core region 300b may be the second low concentration doping region 330. The second low concentration doping region 330 may be doped with the P-type dopant. The second high concentration doping region 353 may be formed on the second low concentration doping region 330. The second high concentration doping region 353 may be in contact with the second low concentration doping region 330. The second high concentration doping region 353 may be doped with the P-type dopant. The first high concentration doping region 351 may be formed on the second high concentration doping region 353. The first high concentration doping region 351 may be in contact with the second high concentration doping region 353. The first high concentration doping region 351 may be doped with the N-type dopant. The first low concentration doping region 310 may be formed on the first high concentration doping region 351. The first low concentration doping region 310 may be in contact with the first high concentration doping region 351. The first low concentration doping region 310 may be doped with the N-type dopant.

A dopant concentration of the first low concentration doping region 310 may be lower than a dopant concentration of the first high doping concentration region 351. A dopant concentration of the second low concentration doping region 330 may be lower than a dopant concentration of the second high concentration doping region 353.

In an example embodiment, the dopant concentration of the first low concentration doping region 310 may be lower than the dopant concentration of the high concentration doping region 350. If the dopant concentration of the high concentration doping region 350 is high, a carrier density of the high concentration doping region 350 may be high. If the carrier density is high, a transmission of the optical signal may be blocked.

For example, the first low concentration doping region 310 may be doped with the N-type dopant. In this case, the N-type dopant in the first high concentration doping region 351 may be greater than the N-type dopant in the first low concentration doping region 310. If the N-type dopant in the first high concentration doping region 351 is greater than the N-type dopant in the first low concentration doping region 310, the transmission of the optical signal through the first high concentration doping region 351 may be blocked. Likewise, the second low concentration doping region 330 may be doped with the P-type dopant. In this case, the P-type dopant in the second high concentration doping region 353 may be greater than the P-type dopant in the second low concentration doping region 330. If the P-type dopant in the second high concentration doping region 353 is greater than the P-type dopant in the second low concentration doping region 330, the transmission of the optical signal through the second high concentration doping region 353 may be blocked.

The width of a depletion region included in the core region 300b may be controlled based on a reverse bias voltage applied between the first low concentration doping region 310 and the second low concentration doping region 330. For example, if the first low concentration doping region 310 is doped with the N-type dopant, the second low concentration doping region 331 may be doped with the P-type dopant. The voltage level applied to the first low concentration doping region 310 is higher than the voltage level applied to the second low concentration doping region 330. The depletion region in the high concentration doping region 350 may be formed by the reverse bias voltage applied between the first low concentration doping region 310 and the second low concentration doping region 330. If the reverse bias voltage is applied, the width of the depletion region included in the core region 300b may be controlled. If the width of the depletion region is controlled, the optical signal transferred through the depletion region may be controlled.

In an example embodiment, the first high concentration doping region 351 may be n-type dopant doping region in case the first low concentration doping region 310 is the n-type dopant doping region. The second high concentration doping region 353 may be p-type dopant doping region in case the second low concentration doping region 330 is the p-type dopant doping region.

In an example embodiment, an operating voltage may be applied between the first low concentration doping region 310 and the second low concentration doping region 330.

In an example embodiment, the width of a depletion region included in the core region 300b may be controlled based on the operating voltage.

In an example embodiment, an outside voltage may be applied to the slab region. The outside voltage may be transferred from the slab region to the core region 300 as the operating voltage.

Figure 4:
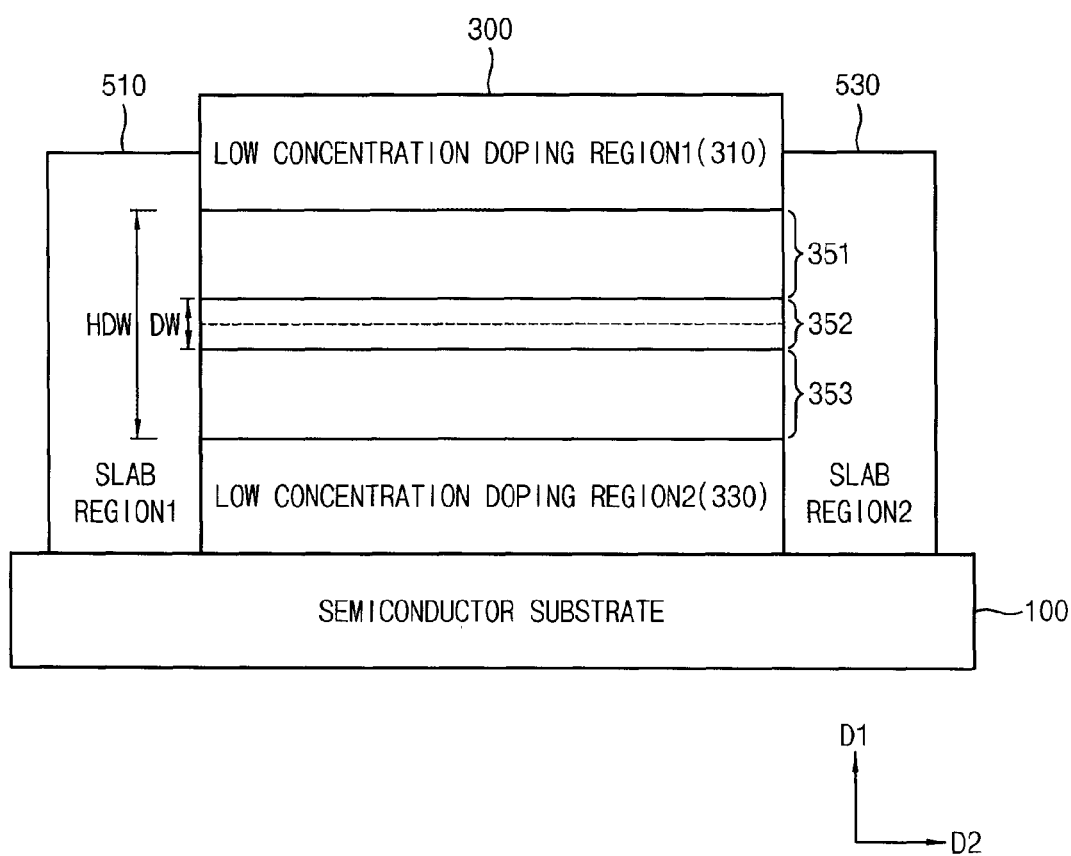
FIG. 4 is a diagram for describing a case of applying a zero voltage to the electro-optic modulator of FIG. 1.

FIG. 4 is a diagram for describing a case of applying a zero voltage to the electro-optic modulator of FIG. 1.

Referring to FIG. 4, the electro-optic modulator 10 includes the semiconductor substrate 100, the core region 300 and the slab regions 510 and 530. The core region 300 is formed on the semiconductor substrate 100 and includes the first low concentration doping region 310, the second low concentration doping region 330 and the high concentration doping region 350. The high concentration doping region 350 is formed between the first low concentration doping region 310 and the second low concentration doping region 330. The high concentration doping region 350 includes the first high concentration doping region 351 and the second high concentration doping region 353.

A width DW of a depletion region 352 included in the core region 300 may be controlled based on a reverse bias voltage applied between the first low concentration doping region 310 and the second low concentration doping region 330.

In an example embodiment, in the case that the operating voltage applied between the first low concentration doping region 310 and the second low concentration doping region 330 is a zero voltage, the width DW of the depletion region 352 may be narrower than the width HDW of the high concentration doping region 350.

The width HDW of the high concentration doping region 350 may be a sum of the width of the first high concentration doping region 351 and the width of the second high concentration doping region 353. For example, in case the first high concentration doping region 351 is doped with the P-type dopant and the second high concentration doping region 353 is doped with the N-type dopant, the width of the first high concentration doping region 351 may be a width of the high concentration P-type doping region and the width of the second high concentration doping region 353 may be a width of the high concentration N-type doping region. Likewise, in case the first high concentration doping region 351 is doped with the N-type dopant and the second high concentration doping region 353 is doped with the P-type dopant, the width of the first high concentration doping region 351 may be a width of the high concentration N-type doping region and the width of the second high concentration doping region 353 may be a width of the high concentration P-type doping region.

In case the operating voltage applied between the first low concentration doping region 310 and the second low concentration doping region 330 is a reverse bias voltage, the width DW of the depletion region 352 may be increased as the reverse bias voltage is increased. In case the operating voltage applied between the first low concentration doping region 310 and the second low concentration doping region 330 is the zero voltage, the width DW of the depletion region 352 may be narrower than the width HDW of the high concentration doping region 350.

The width DW of a depletion region 352 included in the core region 300 may be controlled based on a reverse bias voltage applied between the first low concentration doping region 310 and the second low concentration doping region 330. If the width DW of a depletion region 352 is controlled, an optical signal transmitted through the depletion region 352 may be controlled. The electro-optic modulator 10 according to example embodiments may increase an operation speed and decrease a power consumption of a system.

Figure 5:
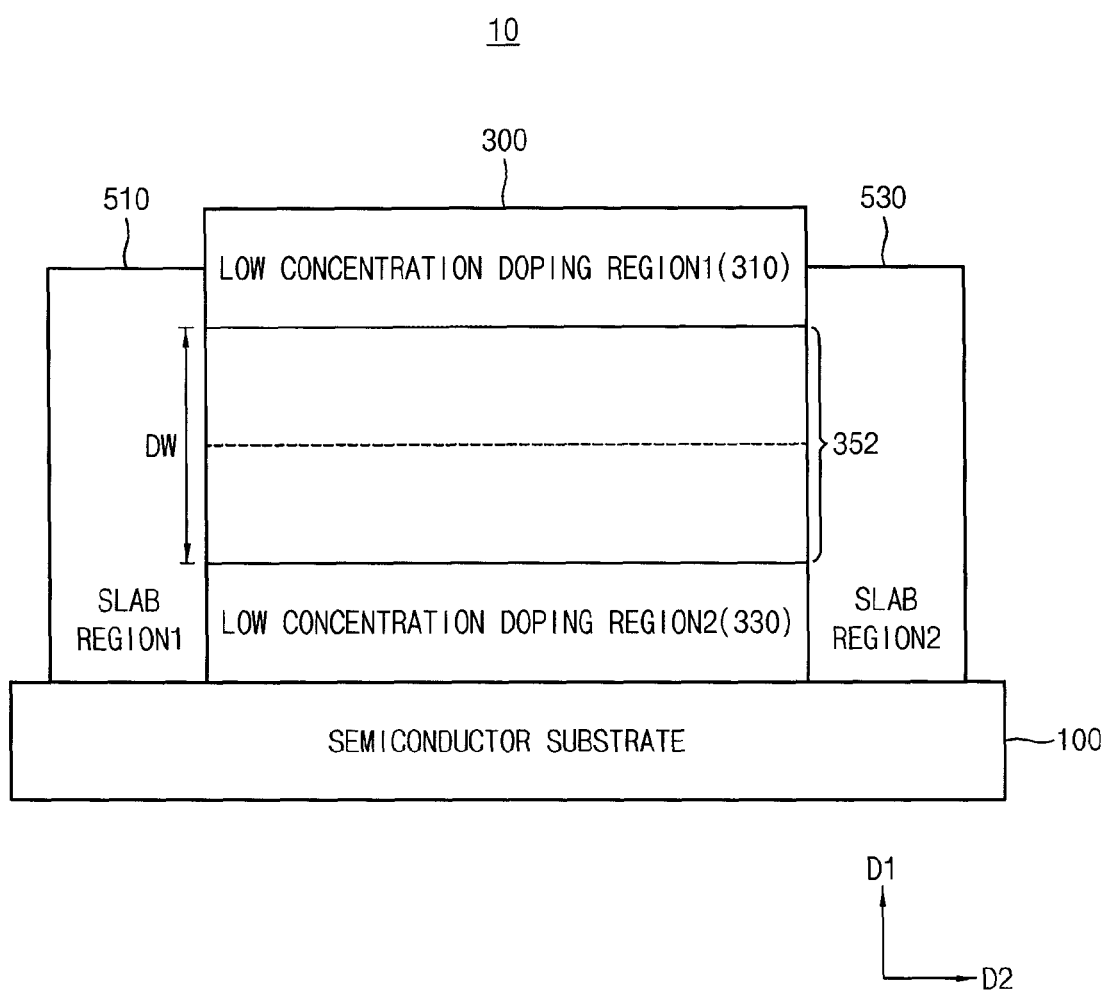
FIG. 5 is a diagram for describing a case of applying a reverse bias voltage to the electro-optic modulator of FIG. 1.

FIG. 5 is a diagram for describing a case of applying a reverse bias voltage to the electro-optic modulator of FIG. 1.

Referring to FIG. 5, the electro-optic modulator 10 has been described with reference to FIG. 1, therefore, for the sake of brevity repeated description thereof will be omitted.

As discussed above with regard to FIG. 4, the width DW of the depletion region 352 included in the core region 300 may be controlled based on the reverse bias voltage applied between the first low concentration doping region 310 and the second low concentration doping region 330.

For example, if the first low concentration doping region 310 is doped with the N-type dopant, the second low concentration doping region 330 may be doped with the P-type dopant. In this case, a voltage level applied to the first low concentration doping region 310 is higher than a voltage level applied to the second low concentration doping region 330. The depletion region 352 in the high concentration doping region 350 may be formed by the reverse bias voltage applied between the first low concentration doping region 310 and the second low concentration doping region 330. If the reverse bias voltage is applied, the width DW of the depletion region 352 included in the core region 300 may be controlled. If the width DW of the depletion region 352 is controlled, the optical signal transferred through the depletion region 352 may be controlled.

In an example embodiment, the optical loss of the core region 300 may change as the width DW of the depletion region 352 is changed.

In an example embodiment, the intensity of an optical signal transferred through the core region may be adjusted as the optical loss of the core region 300 is changed.

FIG. 6 is a diagram illustrating a width of the core region and a slab region included in the electro-optic modulator of FIG. 1.

Referring to FIG. 6, the electro-optic modulator 10 has been described with reference to FIG. 1, therefore, for the sake of brevity repeated description thereof will be omitted.

In the electro-optic modulator 10, a width CW of the core region 300 may be greater than the width SW of the slab region. The width CW of the core region 300 may be a length from the semiconductor substrate 100 to the upper end of the core region 300 along the first direction D1.

For example, the width CW of the core region 300 may be a sum of the width of the low concentration doping region and the width HDW of the high concentration doping region 350, illustrated in FIG. 4. The width of the low concentration doping region may be a length of the low concentration doping region along the first direction D1. The width HDW of the high concentration doping region 350 may be a length of the high concentration doping region 350 along the first direction D1.

The width of the low concentration doping region may be a sum of the width of the first low concentration doping region 310 and the width of the second low concentration doping region 330. The width of the first low concentration doping region 310 may be a length of the first low concentration doping region 310 along the first direction D1. The width of the second low concentration doping region 330 may be a length of the second low concentration doping region 330 along the first direction D1.

The width HDW of the high concentration doping region 350 may be a sum of the width of the first high concentration doping region 351 and the width of the second high concentration doping region 353. The width of the first high concentration doping region 351 may be a length of the first high concentration doping region 351 along the first direction D1. The width of the second high concentration doping region 353 may be a length of the second high concentration doping region 353 along the first direction D1. The width SW of the slab region may be a length of the slab region along the first direction D1.

In an example embodiment, the electro-optic modulator 10 may be implemented using at least one selected from a group consisting of Si, Ge, GaAs and a combination thereof.

FIG. 7 is a cross-sectional diagram illustrating a perpendicular structure of the electro-optic modulator according to an example embodiment.

Referring to FIG. 7, an electro-optic modulator 15 may include a core region 400, the semiconductor substrate 100 and the slab regions 510 and 530. The core region 400 may include the low concentration doping region and the high concentration doping region 450. The low concentration doping region may include a first low concentration doping region 410 and a second low concentration doping region 430. The high concentration doping region 450 may include a first high concentration doping region 451 and a second high concentration doping region 453.

The first high concentration doping region 451 may be formed between the first low concentration doping region 410 and the second low concentration doping region 430 and the first high concentration doping region 451 may be in contact with the first low concentration doping region 410. The second high concentration doping region 453 may be formed between the first high concentration doping region 451 and the second low concentration doping region 430 and the second high concentration doping region 453 may be in contact with the second low concentration doping region 430. The first high concentration doping region 451 and the second high concentration doping region 453 may be in contact with each other.

For example, along a second direction D2, a right end region of the core region 400 may be the second low concentration doping region 430. The second low concentration doping region 430 may be doped with the N-type dopant. The second high concentration doping region 453 may be formed on a left side of the second low concentration doping region 430. The second high concentration doping region 453 may be in contact with the second low concentration doping region 430. The second high concentration doping region 453 may be doped with the N-type dopant. The first high concentration doping region 451 may be formed on the left side of the second high concentration doping region 453. The first high concentration doping region 451 may be in contact with the second high concentration doping region 453. The first high concentration doping region 451 may be doped with the P-type dopant. The first low concentration doping region 410 may be formed on the left side of the first high concentration doping region 451. The first low concentration doping region 410 may be in contact with the first high concentration doping region 451. The first low concentration doping region 410 may be doped with the P-type dopant.

In an example embodiment, the dopant concentration of the first low concentration doping region 410 may be lower than the dopant concentration of the high concentration doping region 450. If the dopant concentration of the high concentration doping region 450 is high, a carrier density of the high concentration doping region 450 may be high. If the carrier density is high, a transmission of the optical signal may be blocked. For example, the first low concentration doping region 410 may be doped with the P-type dopant. In this case, the P-type dopant in the first high concentration doping region 451 may be greater than the P-type dopant in the first low concentration doping region 410. If the P-type dopant in the first high concentration doping region 451 is greater than the P-type dopant in the first low concentration doping region 410, the transmission of the optical signal through the first high concentration doping region 451 may be blocked. Likewise, the second low concentration doping region 430 may be doped with the N-type dopant. In this case, the N-type dopant in the second high concentration doping region 453 may be greater than the N-type dopant in the second low concentration doping region 430. If the N-type dopant in the second high concentration doping region 453 is greater than the N-type dopant in the second low concentration doping region 430, the transmission of the optical signal through the second high concentration doping region 453 may be blocked.

As illustrated in FIG. 10 (discussed below), the width DW of a depletion region 452 included in the core region 400 may be controlled based on a reverse bias voltage applied between the first low concentration doping region 410 and the second low concentration doping region 430. For example, if the first low concentration doping region 410 is doped with the P-type dopant, the second low concentration doping region 430 may be doped with the N-type dopant. The voltage level applied to the first low concentration doping region 410 is lower than the voltage level applied to the second low concentration doping region 430. The depletion region 452 in the high concentration doping region 450 may be formed by the reverse bias voltage applied between the first low concentration doping region 410 and the second low concentration doping region 430. If the reverse bias voltage is applied, the width DW of the depletion region 452 included in the core region 400 may be controlled. If the width DW of the depletion region 452 is controlled, the optical signal transferred through the depletion region 452 may be controlled.

In an example embodiment, the first high concentration doping region 451 may be the p-type dopant doping region in case the first low concentration doping region 410 is the p-type dopant doping region. The second high concentration doping region 453 may be the n-type dopant doping region in case the second low concentration doping region 430 is the n-type dopant doping region.

FIG. 8 is a cross-sectional diagram illustrating an example of a core region included in the electro-optic modulator of FIG. 7.

Referring to FIG. 8, the core region 400*a* may include a low concentration doping region and the high concentration doping region 450. The low concentration doping region may include the first low concentration doping region 410 and the second low concentration doping region 430. The high concentration doping region 450 may include the first high concentration doping region 451 and the second high concentration doping region 453.

For example, if the first low concentration doping region 410 is doped with the P-type dopant, the first low concentration doping region 410 may be a low concentration P-type doping region. If the second low concentration doping region 430 is doped with the N-type dopant, the second low concentration doping region 430 may be a low concentration N-type doping region. If the first high concentration doping region 451 is doped with the P-type dopant, the first high concentration doping region 451 may be a high concentration P-type doping region. If the second high concentration doping region 453 is doped with the N-type dopant, the second high concentration doping region 453 may be a high concentration N-type doping region.

For example, along the second direction D2, a right end region of the core region 400*a* may be the second low concentration doping region 430. The second low concentration doping region 430 may be doped with the N-type dopant. The second high concentration doping region 453 may be formed on the second low concentration doping region 430. The second high concentration doping region 453 may be in contact with the second low concentration doping region 430. The second high concentration doping region 453 may be doped with the N-type dopant. The first high concentration doping region 451 may be formed on a left side of the second high concentration doping region 453. The first high concentration doping region 451 may be in contact with the second high concentration doping region 453. The first high concentration doping region 451 may be doped with the P-type dopant. The first low concentration doping region 410 may be formed on the left side of the first high concentration doping region 451. The first low concentration doping region 410 may be in contact with the first high concentration doping region 451. The first low concentration doping region 410 may be doped with the P-type dopant.

In an example embodiment, the dopant concentration of the first low concentration doping region 410 may be lower than the dopant concentration of the high concentration doping region 450. If the dopant concentration of the high concentration doping region 450 is high, a carrier density of the high concentration doping region 450 may be high. If the carrier density is high, a transmission of the optical signal may be blocked. For example, the first low concentration doping region 410 may be doped with the P-type dopant. In this case, the P-type dopant in the first high concentration doping region 451 may be greater than the P-type dopant in the first low concentration doping region 410. If the P-type dopant in the first high concentration doping region 451 is greater than the P-type dopant in the first low concentration doping region 410, the transmission of the optical signal through the first high concentration doping region 451 may be blocked. For example, the second low concentration doping region 430 may be doped with the N-type dopant. In this case, the N-type dopant in the second high concentration doping region 453 may be greater than the N-type dopant in the second low concentration doping region 430. If the N-type dopant in the second high concentration doping region 453 is greater than the N-type dopant in the second low concentration doping region 430, the transmission of the optical signal through the second high concentration doping region 453 may be blocked.

The width DW of a depletion region 452 included in the core region 400*a* may be controlled based on a reverse bias voltage applied between the first low concentration doping region 410 and the second low concentration doping region 430. For example, if the first low concentration doping region 410 is doped with the P-type dopant, the second low concentration doping region 430 may be doped with the N-type dopant. The voltage level applied to the first low concentration doping region 410 is lower than the voltage level applied to the second low concentration doping region 430. The depletion region 452 in the high concentration doping region 450 may be formed by the reverse bias voltage applied between the first low concentration doping region 410 and the second low concentration doping region 430. If the reverse bias voltage is applied, the width DW of the depletion region 452 included in the core region 400*a* may be controlled. If the width DW of the depletion region 452 is controlled, the optical signal transferred through the depletion region 452 may be controlled.

In an example embodiment, the first high concentration doping region 451 may be the p-type dopant doping region in case the first low concentration doping region 410 is the p-type dopant doping region. The second high concentration doping region 453 may be the n-type dopant doping region in case the second low concentration doping region 430 is the n-type dopant doping region.

The width DW of a depletion region 452 included in the core region 400*a* may be controlled based on a reverse bias voltage applied between the first low concentration doping region 410 and the second low concentration doping region 430. If the width DW of a depletion region 452 is controlled, an optical signal transmitted through the depletion region 452 may be controlled. The electro-optic modulator 15 according to example embodiments may increase an operation speed and decrease a power consumption of a system.

FIG. 9 is a cross-sectional diagram illustrating another example of the core region included in the electro-optic modulator of FIG. 7.

Referring to FIG. 9, a core region 400*b* is an example of the core region 400 illustrated in FIG. 7, therefore, for the sake of brevity repeated description of the relationship between the regions 410, 430, 451 and 453 will be omitted.

In the core region 400*b*, the first low concentration doping region 410 and the first high concentration doping region 451 are doped with N-type dopants and the second low concentration doping region 430 and the second high concentration doping region 453 are doped with P-type dopants. The first low concentration doping region 410 may be a low concentration N-type doping region, the second low concentration doping region 430 may be a low concentration P-type doping region, the first high concentration doping region 451 may be a high concentration N-type doping region, and the second high concentration doping region 453 may be a high concentration P-type doping region.

For example, along the second direction D2, a right end region of the core region 400b may be the second low concentration doping region 430. The second high concentration doping region 453 may be formed on a left side of the second low concentration doping region 430. The second high concentration doping region 453 may be in contact with the second low concentration doping region 430. The first high concentration doping region 451 may be formed on the left side of the second high concentration doping region 453. The first high concentration doping region 451 may be in contact with the second high concentration doping region 453. The first low concentration doping region 410 may be formed on the left side of the first high concentration doping region 451. The first low concentration doping region 410 may be in contact with the first high concentration doping region 451.

In an example embodiment, the dopant concentration of the first low concentration doping region 410 may be lower than the dopant concentration of the high concentration doping region 450. If the dopant concentration of the high concentration doping region 450 is high, a carrier density of the high concentration doping region 450 may be high. If the carrier density is high, a transmission of the optical signal may be blocked. For example, the first low concentration doping region 410 may be doped with the N-type dopant. In this case, the N-type dopant in the first high concentration doping region 451 may be greater than the N-type dopant in the first low concentration doping region 410. If the N-type dopant in the first high concentration doping region 451 is greater than the N-type dopant in the first low concentration doping region 410, the transmission of the optical signal through the first high concentration doping region 451 may be blocked. Likewise, the second low concentration doping region 430 may be doped with the P-type dopant. In this case, the P-type dopant in the second high concentration doping region 453 may be greater than the P-type dopant in the second low concentration doping region 430. If the P-type dopant in the second high concentration doping region 453 is greater than the P-type dopant in the second low concentration doping region 430, the transmission of the optical signal through the second high concentration doping region 453 may be blocked.

As illustrated in FIG. 10, the width DW of the depletion region 452 included in the core region 400b may be controlled based on a reverse bias voltage applied between the first low concentration doping region 410 and the second low concentration doping region 430. For example, if the first low concentration doping region 410 is doped with the N-type dopant, the second low concentration doping region 430 may be doped with the P-type dopant. The voltage level applied to the first low concentration doping region 410 is higher than the voltage level applied to the second low concentration doping region 430. The depletion region 452 in the high concentration doping region 450 may be formed by the reverse bias voltage applied between the first low concentration doping region 410 and the second low concentration doping region 430. If the reverse bias voltage is applied, the width DW of the depletion region 452 included in the core region 400b may be controlled. If the width DW of the depletion region 452 is controlled, the optical signal transferred through the depletion region 452 may be controlled.

FIG. 10 is a diagram for describing a case of applying a zero voltage to the electro-optic modulator of FIG. 7, and FIG. 11 is a diagram for describing a case of applying a reverse bias voltage to the electro-optic modulator of FIG. 7.

Referring to FIGS. 10 and 11, the electro-optic modulator 15 has been described with reference to FIG. 7, therefore, for the sake of brevity repeated thereof will be omitted.

In the electro-optic modulator 15, the width DW of a depletion region 452 included in the core region 400 may be controlled based on a reverse bias voltage applied between the first low concentration doping region 410 and the second low concentration doping region 430. In an example embodiment, in case the operating voltage applied between the first low concentration doping region 410 and the second low concentration doping region 430 is a zero voltage, the width DW of the depletion region 452 may be narrower than the width HDW of the high concentration doping region 450.

For example, if the first low concentration doping region 410 is doped with the N-type dopant, the second low concentration doping region 430 may be doped with the P-type dopant. In this case, a voltage level applied to the first low concentration doping region 410 is higher than a voltage level applied to the second low concentration doping region 430. The depletion region 452 in the high concentration doping region 450 may be formed by the reverse bias voltage applied between the first low concentration doping region 410 and the second low concentration doping region 430. If the reverse bias voltage is applied, the width DW of the depletion region 452 included in the core region 400 may be controlled. If the width DW of the depletion region 452 is controlled, the optical signal transferred through the depletion region 452 may be controlled.

In an example embodiment, the width DW of the depletion region 452 included in the core region 400 may be controlled based on the operating voltage applied between the first low concentration doping region 410 and the second low concentration doping region 430. In case the operating voltage is a reverse bias voltage, the width DW of the depletion region 452 may be increased as the reverse bias voltage is increased.

Figure 12:
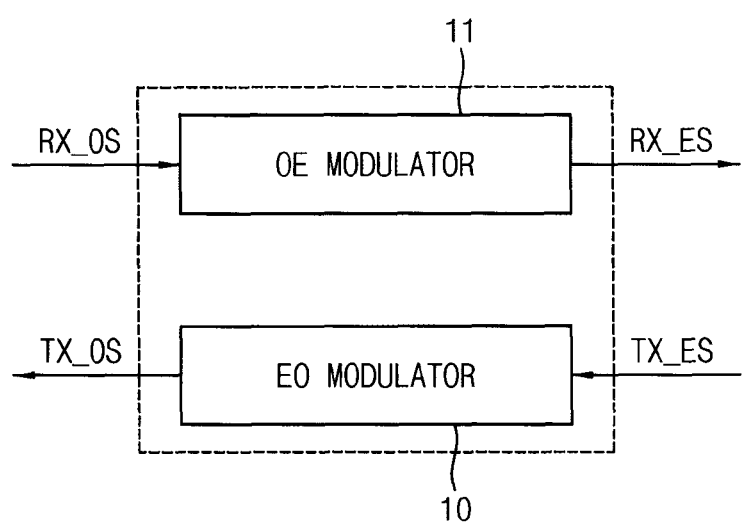
FIG. 12 is a block diagram illustrating an optic transmission modulator according to example embodiments.

FIG. 12 is a block diagram illustrating an optic transmission modulator according to example embodiments.

Referring to FIGS. 1 and 12, an optic transmission modulator 25 includes the electro-optic modulator 10. The electro-optic modulator 10 has been described with reference to FIG. 1, therefore, for the sake of brevity repeated thereof will be omitted. While FIG. 12 illustrates the electro-optical modulator 10, the electro-optical modulator 15 having the perpendicular structure may be included in the optic transmission modulator 25.

The electro-optic modulator 10 converts a transmission electrical signal to a transmission optical signal transmitted to the memory controller.

A width DW of the depletion region 352 included in the core region 300 of the electro-optic modulator 10 may be controlled based on a reverse bias voltage applied between the first low concentration doping region 310 and the second low concentration doping region 330. If the width DW of a depletion region 352 is controlled, an optical signal transmitted through the depletion region 352 may be controlled. The electro-optic modulator 10 according to example embodiments may increase an operation speed and decrease a power consumption of a system.

Figure 13:
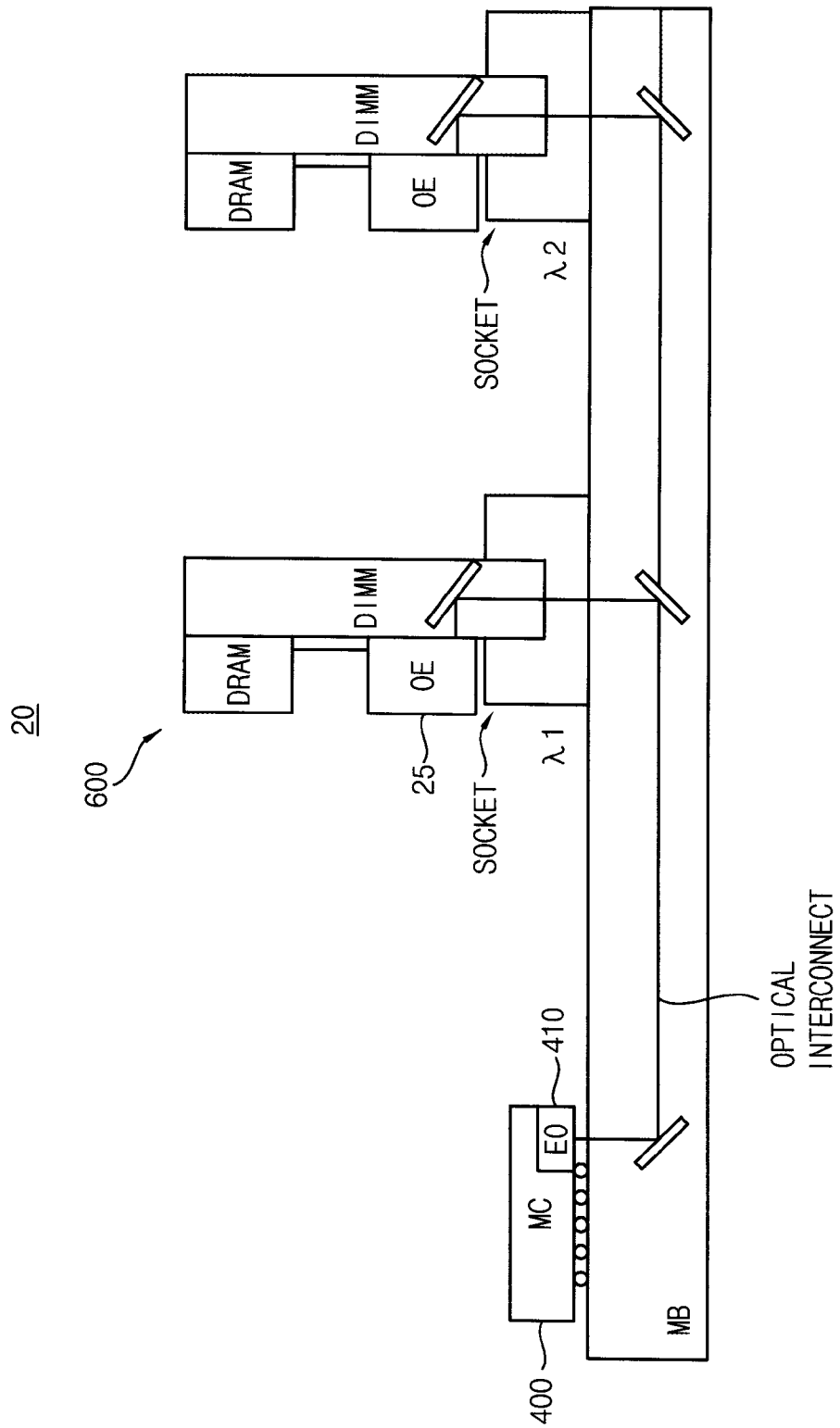
FIG. 13 is a block diagram illustrating a memory system including the optic transmission modulator of FIG. 12.

FIG. 13 is a block diagram illustrating a memory system including the optic transmission modulator of FIG. 12.

Referring to FIGS. 12 and 13, a memory system 20 includes the memory controller 400 and at least one memory device 600. For example, the memory controller 400 and the memory device 600 may be equipped on a mother board MB. The memory device 600 may be implemented as a memory module. The memory module may be equipped on a socket included in the mother board MB. The memory controller 400 and the memory device 600 may be connected through the optical channel. The memory controller 400 may include an electro to optic device 410.

The memory device 600 may include a Dynamic random-access memory (DRAM) and a dual in-line memory module (DIMM) and the optic transmission modulator 25. The optic transmission modulator 25 may include the electro-optic modulator 10. Reception optical signal RX_OS from the memory controller 400 may be transmitted through the optical channel. The optical signal may include optical signals that are modulated with a plurality of light signals, the light signals having a plurality of wavelengths. The plurality of the light signals may be laser light signals.

An optic-electro modulator 11 converts the reception optical signal RX_OS to reception electrical signals RX_ES. The optic-electro modulator 11 may have a same structure as the electro-optic modulator 10 and/or the electro-optical modulator 15.

The electro-optic modulator 10 converts a transmission electrical signal TX_ES to a transmission optical signal TX_OS. The transmission optical signal TX_OS may be transmitted to the memory controller 400 through the optical channel. The electro-optic modulator 10 according to example embodiments may increase an operation speed and decrease a power consumption of a system.

Figure 14:
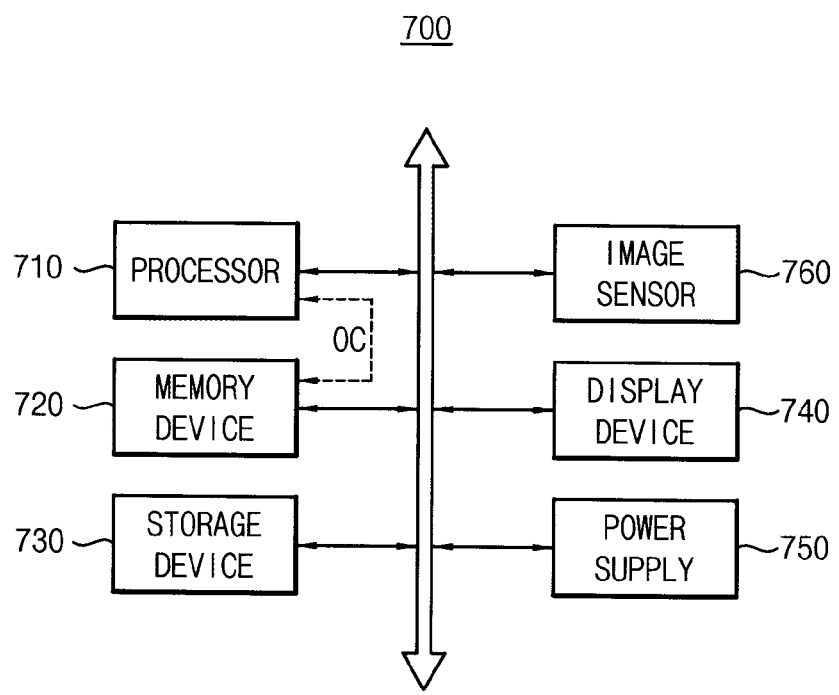
FIG. 14 is a block diagram illustrating a mobile device including the optic transmission modulator according to example embodiments.

FIG. 14 is a block diagram illustrating a mobile device including the optic transmission modulator according to example embodiments.

Referring to FIG. 14, a mobile device 700 may include a processor 710, a memory device 720, a storage device 730, a display device 740, a power supply 750 and an image sensor 760. The mobile device 700 may further include ports that communicate with a video card, a sound card, a memory card, a USB device, other electronic devices, etc.

The processor 710 may perform various calculations or tasks. The processor 710 may be a microprocessor or a CPU. The processor 710 may communicate with the memory device 720, the storage device 730, and the display device 740 via an address bus, a control bus, and/or a data bus. In one or more example embodiments, the processor 710 may be coupled to an extended bus, such as a peripheral component interconnection (PCI) bus. The memory device 720 may store data for operating the mobile device 700. For example, the memory device 720 may be implemented with a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device.

The memory device 720 includes a data loading circuit according to example embodiments. The storage device 730 may include a solid state drive (SSD), a hard disk drive (HDD), a CD-ROM, etc. The mobile device 700 may further include an input device such as a touchscreen, a keyboard, a keypad, a mouse, etc., and an output device such as a printer, a display device, etc. The power supply 750 supplies operation voltages for the mobile device 700.

The image sensor 760 may communicate with the processor 710 via the buses or other communication links. The image sensor 760 may be integrated with the processor 710 in one chip, or the image sensor 760 and the processor 710 may be implemented as separate chips.

At least a portion of the mobile device 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). The mobile device 700 may be a digital camera, a mobile phone, a smart phone, a portable multimedia player (PMP), a personal digital assistant (PDA), a computer, etc.

The memory system may include the electro-optic modulator 11 such that the processor 710 and the memory device 720 may communicate over an optical connection (OC). The width DW of the depletion region 352 included in the core region 300 may be controlled based on a reverse bias voltage applied between the first low concentration doping region 310 and the second low concentration doping region 330 included in the electro-optic modulator 11. If the width DW of the depletion region 352 is controlled, an optical signal transmitted through the depletion region 352 may be controlled. The electro-optic modulator 11 according to example embodiments may increase an operation speed and decrease a power consumption of a system.

Figure 15:
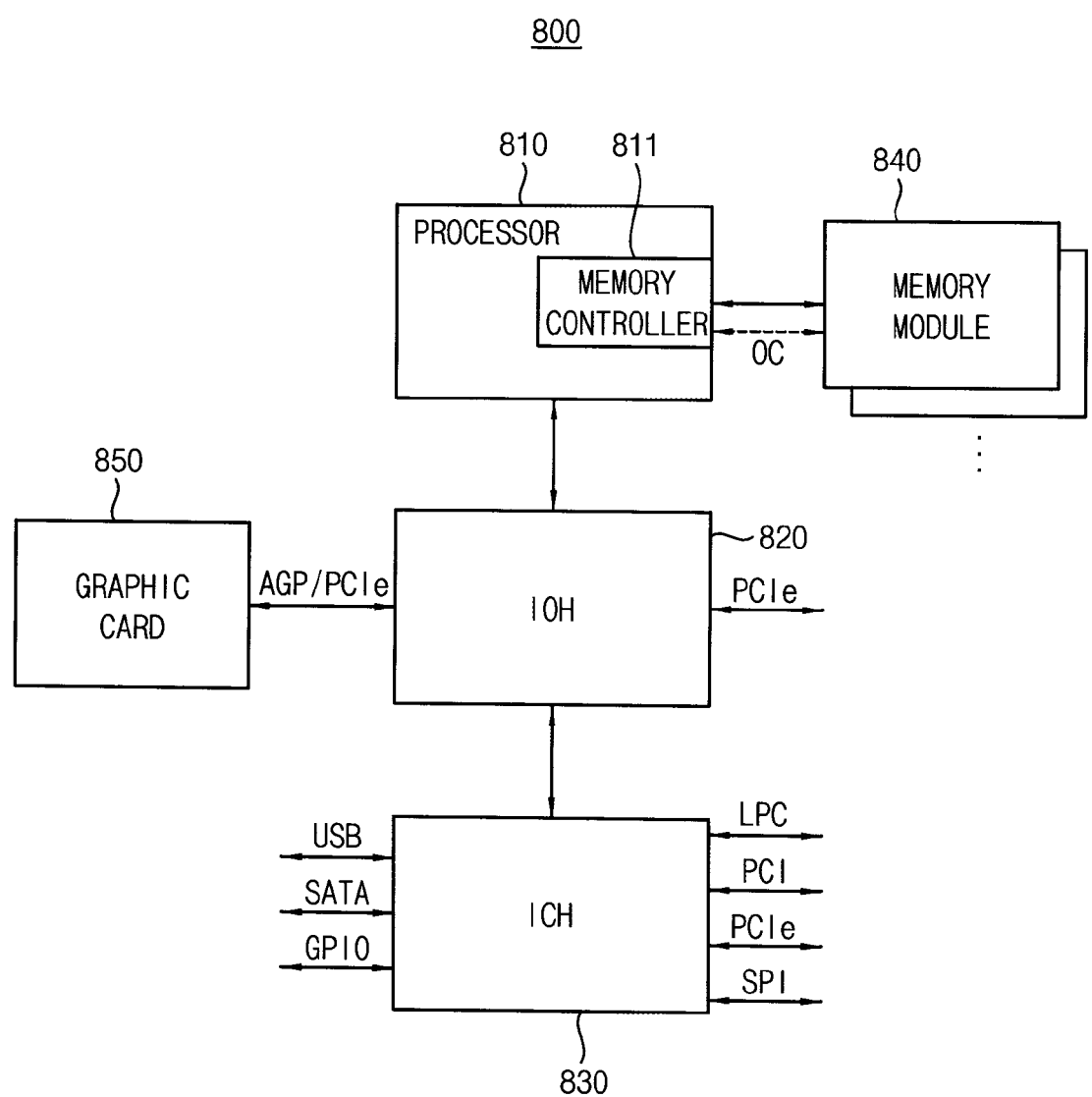
FIG. 15 is a block diagram illustrating a computing system including the optic transmission modulator according to example embodiments.

FIG. 15 is a block diagram illustrating a computing system including the optic transmission modulator according to example embodiments.

Referring to FIG. 15, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. In some embodiments, the computing system 800 may include a plurality of processors 810. The processor 810 may include an internal or external cache memory.

The processor 810 may include a memory controller 811 for controlling operations of the memory module 840. The memory controller 811 included in the processor 810 may be referred to as an integrated memory controller (IMC). A memory interface between the memory controller 811 and the memory module 840 may be implemented with a single channel including a plurality of signal lines, or may bay be implemented with multiple channels, to each of which at least one memory module 840 may be coupled. In some embodiments, the memory controller 811 may be located inside the input/output hub 820, which may be referred to as memory controller hub (MCH). The memory controller 811 and the memory modules 840 may communicate over an optical connection (OC).

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a QuickPath interconnect (QPI), a common system interface (CSI), etc. In some embodiments, the computing system 800 may include a plurality of input/output hubs. The input/output hub 820 may provide various interfaces with the devices. For example, the input/output hub 820 may provide an accelerated graphics port (AGP) interface, a peripheral component interface-express (PCIe), a communications streaming architecture (CSA) interface, etc.

The graphics card 850 may be coupled to the input/output hub 820 via AGP or PCIe. The graphics card 850 may control a display device (not shown) for displaying an image. The graphics card 850 may include an internal processor for processing image data and an internal memory device. In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 810, the input/output hub 820 and the input/output controller hub 830 may be implemented as separate chipsets or separate integrated circuits. In other embodiments, at least two of the processor 810, the input/output hub 820 and the input/output controller hub 830 may be implemented as a single chipset.

Example embodiments of the inventive concepts may be applied to systems such as be a mobile phone, a smart phone, a personal digital assistant (PDA), a portable multimedia player (PMP), a digital camera, a music player, a portable game console, a navigation system, etc. The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of example embodiments of the inventive concepts as defined in the claims.

The memory system may include the electro-optic modulator. The width of a depletion region included in the core region may be controlled based on a reverse bias voltage applied between the first low concentration doping region and the second low concentration doping region included in the electro-optic modulator. If the width of a depletion region is controlled, an optical signal transmitted through the depletion region may be controlled. The electro-optic modulator according to example embodiments may increase an operation speed and decrease a power consumption of a system.

What is claimed is:
1. An electro-optic modulator comprising:
   a semiconductor substrate;
   a core region on the semiconductor substrate, the core region including a first low concentration doping region, a second low concentration doping region and a high concentration doping region between the first low concentration doping region and the second low concentration doping region, the core region configured to form a depletion region between the first low concentration doping region and the second low concentration doping region when an operating voltage is applied therebetween, a width of the depletion region being controlled based on the operating voltage such that the width of the depletion region is narrower than a width of the high concentration doping region, if the operating voltage is a zero voltage; and
   slab regions on the semiconductor substrate, the slab regions being in contact with the core region.
2. The electro-optic modulator of claim 1, wherein the core region is a waveguide configured to transfer optical signals.
3. The electro-optic modulator of claim 1, wherein the high concentration doping region comprises:
   a first high concentration doping region between the first low concentration doping region and the second low concentration doping region, the first high concentration doping region being in contact with the first low concentration doping region; and
   a second high concentration doping region between the first high concentration doping region and the second low concentration doping region such that the second high concentration doping region is in contact with the first high concentration doping region and the second low concentration doping region.
4. The electro-optic modulator of claim 3, wherein the first low concentration doping region, the first high concentration doping region, the second high concentration doping region and the second low concentration doping region included in the core region are along a first direction and the second low concentration doping region is in contact with the semiconductor substrate, the first direction being perpendicular to a surface of the semiconductor substrate.
5. The electro-optic modulator of claim 4, wherein
   a dopant concentration of the first low concentration doping region and a dopant concentration of the second low concentration doping region are lower than a dopant concentration of the high concentration doping region,
   the first low concentration doping region is a p-type dopant doping region, and
   the second low concentration doping region is an n-type dopant doping region.
6. The electro-optic modulator of claim 5, wherein
   the first high concentration doping region is the p-type dopant doping region if the first low concentration doping region is the p-type dopant doping region, and
   the second high concentration doping region is the n-type dopant doping region if the second low concentration doping region is the n-type dopant doping region.

7. The electro-optic modulator of claim 4, wherein
a dopant concentration of the first low concentration doping region is lower than a dopant concentration of the first high doping concentration region, and
a dopant concentration of the second low concentration doping region is lower than a dopant concentration of the second high concentration doping region.

8. The electro-optic modulator of claim 7, wherein
the first high concentration doping region is the n-type dopant doping region if the first low concentration doping region is the n-type dopant doping region, and
the second high concentration doping region is the p-type dopant doping region if the second low concentration doping region is the p-type dopant doping region.

9. The electro-optic modulator of claim 1, wherein, the electro-optic modulator is configured to control the width of the depletion region such that, if the operating voltage is a reverse bias voltage, the width of the depletion region increases as the reverse bias voltage is increased.

10. The electro-optic modulator of claim 9, wherein the core region has an optical loss associated with transmission therethrough such that the optical loss changes as the width of the depletion region changes.

11. The electro-optic modulator of claim 10, wherein an intensity of an optical signal transferred through the core region changes as the optical loss of the core region changes.

12. The electro-optic modulator of claim 1, wherein
a width of the core region is greater than the width of the slab region, and
the electro-optic modulator includes at least one semiconductor selected from a group consisting of Si, Ge, GaAs and a combination thereof.

13. The electro-optic modulator of claim 3, wherein the first low concentration doping region, the first high concentration doping region, the second high concentration doping region and the second low concentration doping region included in the core region are along a second direction that is perpendicular to a first direction, the second direction being parallel to a surface of the semiconductor substrate.

14. The electro-optic modulator of claim 13, wherein if the operating voltage is a reverse bias voltage, the width of the depletion region is increased as the reverse bias voltage is increased.

15. An optic transmission modulator comprising:
an electro-optic modulator configured to convert an electrical signal to an optical signal and exchange the optical signal with a memory controller, the electro-optic modulator including,
a semiconductor substrate;
a core region on the semiconductor substrate, the core region including a first low concentration doping region, a second low concentration doping region and a high concentration doping region between the first low concentration doping region and the second low concentration doping region, the core region configured to form a depletion region between the first low concentration doping region and the second low concentration doping region when an operating voltage is applied therebetween, a width of the depletion region being controlled based on the operating voltage such that the width of the depletion region is narrower than a width of the high concentration doping region, if the operating voltage is a zero voltage; and
slab regions on the semiconductor substrate, the slab regions being in contact with the core region.

16. A memory module comprising:
a modulator configured to optically connect the memory module to a memory controller and exchange signals therebetween, the modulator including a core region on a semiconductor substrate between slab regions to form an optical waveguide, the core region including at least two low concentration regions and at least one high concentration doping region therebetween such that the optical waveguide is a doped semiconductor, the modulator configured to supply a reverse bias voltage between the low concentration regions such that a depletion region is formed in the high concentration doping region, the modulator configured to control a width of the depletion region based on the reverse bias voltage such that the width of the depletion region is narrower than a width of the high concentration doping region, if the reverse bias voltage is a zero voltage.

* * * * *